(12) United States Patent
Uchida

(10) Patent No.: US 11,281,021 B2
(45) Date of Patent: Mar. 22, 2022

(54) EYEGLASSES

(71) Applicant: IZONE JAPAN INC., Osaka (JP)

(72) Inventor: Ken Uchida, Osaka (JP)

(73) Assignee: IZONE JAPAN INC., Osaka (JP)

( * ) Notice: Subject to any disclaimer, the term of this patent is extended or adjusted under 35 U.S.C. 154(b) by 0 days.

(21) Appl. No.: 17/051,418

(22) PCT Filed: Nov. 29, 2019

(86) PCT No.: PCT/JP2019/046701
§ 371 (c)(1),
(2) Date: Oct. 28, 2020

(87) PCT Pub. No.: WO2020/116333
PCT Pub. Date: Jun. 11, 2020

(65) Prior Publication Data
US 2021/0311323 A1  Oct. 7, 2021

(30) Foreign Application Priority Data

Dec. 4, 2018 (JP) .............................. JP2018-226945
Jul. 22, 2019 (JP) .............................. JP2019-134270

(51) Int. Cl.
*G02C 5/16* (2006.01)
(52) U.S. Cl.
CPC ..................... *G02C 5/16* (2013.01)
(58) Field of Classification Search
CPC . G02C 5/00; G02C 5/006; G02C 5/06; G02C 5/08; G02C 5/16; G02C 5/20;
(Continued)

(56) References Cited

U.S. PATENT DOCUMENTS

| 1,719,957 A | 7/1929 | Arrick |
| 2012/0169991 A1 | 7/2012 | Yang |
| 2020/0278563 A1* | 9/2020 | Shalon ..................... G02C 5/20 |

FOREIGN PATENT DOCUMENTS

| JP | 54-14551 U1 | 1/1979 |
| JP | 54-43338 U | 3/1979 |

(Continued)

OTHER PUBLICATIONS

International Search Report related to PCT/JP2019/046701.
Extended European Search Report from related EP Application No. 19892234.6 dated Jun. 2, 2021 (7 pages).

*Primary Examiner* — Mustak Choudhury
(74) *Attorney, Agent, or Firm* — Womble Bond Dickinson (US) LLP; Joseph Bach, Esq.

(57) ABSTRACT

To be stably wearable without nose pads and to have a support structure which is inconspicuous when worn, eyeglasses include: temples which are wide in an upward/downward direction; and temple pads each having a tip and a root, the root being fixed to a prescribed location on an inner side of a corresponding one of the temples, each of the temple pads extending along an extension direction of the corresponding one of the temples to gradually deviates from an inner side surface of the corresponding one of the temples from the prescribed location to the tip, each of the temple pads has a root portion which is narrow and a tip portion formed to have a thick shape that gently protrudes downward, the tip portion being in contact with a wearer's temple when the eyeglasses are worn, the temple pads being entirely or mostly hidden by the temples in a side view.

8 Claims, 8 Drawing Sheets

(58) Field of Classification Search
CPC .......... G02C 5/22; G02C 5/143; G02C 3/003; G02C 7/00; G02C 9/00; G02C 11/00; G02C 2200/06; G02C 2200/10; G02C 2200/16; G02C 2200/18; G02C 2200/20; G02C 2200/22
See application file for complete search history.

(56) References Cited

FOREIGN PATENT DOCUMENTS

| | | | |
|---|---|---|---|
| JP | 2001-201721 A | | 7/2001 |
| JP | 2003-121800 A | | 4/2003 |
| JP | 2003121800 A | * | 4/2003 |
| JP | 2011099939 A | | 5/2011 |
| JP | 3198964 U | | 7/2015 |
| JP | 3214365 U | | 1/2018 |
| TW | 201333577 A | | 8/2013 |

* cited by examiner

NORMAL TEMPLE TIP    TEMPLE TIP OF VARIATION

EYEGLASSES

RELATED APPLICATIONS

The present application is the national phase of International Application No. PCT/JP2019/046701, filed on Nov. 29, 2019, which claims priority to and the benefit of Japanese Patent Application No. 2018-226945, filed on Dec. 4, 2018 and 2019-134270 filed Jul. 22, 2019, and the disclosures of which are hereby incorporated herein by reference in their entireties.

TECHNICAL FIELD

The present invention relates to eyeglasses, and in particular, to eyeglasses which are stably wearable without nose pads.

BACKGROUND ART

In general, eyeglasses include a front to which a pair of left and right lenses is fixed, temples extending from both left and right ends of the front, and temple tips attached to respective tips of the temples. Moreover, the front has a central part provided with nose pads to prevent the front from slipping off the face of a person when the eyeglasses are worn.

When a person wears such eyeglasses for a long time, the load of the front of the eyeglasses is continuously applied to his or her nose root with which the nose pads are in contact, and the person may feel uncomfortable. Moreover, when the person takes off the eyeglasses, traces of the nose pads may be left at his or her nose root, which may not be cosmetically preferable. In view of the problems, many eyeglasses without nose pads have been proposed (see, for example, Patent Literatures 1 to 5).

CITATION LIST

Patent Literature

Patent Literature 1: JP 2003-121800 A
Patent Literature 2: JP 2001-201721 A
Patent Literature 3: JP 3214365 U
Patent Literature 4: JP 3198964 U
Patent Literature 5: JP 2011-99939 A

SUMMARY OF INVENTION

Technical Problem

When the nose pads are omitted, the load of the front of the eyeglasses is no longer supported by the nose root, and therefore, background art eyeglasses without nose pads adopt a structure in which the load is supported by wearer's temples.

To stably support the load of the front of the eyeglasses on the face by the temples at temporal regions of the wearer, the size of a support structure has to be increased to a certain extent by, for example, increasing areas that come into contact with the wearer's temples. However, when the size of the support structure is increased, the support structure is conspicuous when the eyeglasses are worn, which may impair appearance. In particular, in eyeglasses which require fashionability, the support structure is desirably made as minimally conspicuous as possible. However, when the support structure is made narrow and small with the priority given to the appearance, the stability is in turn degraded when the eyeglasses are worn. Therefore, the wearing stability and the appearance of the eyeglasses without the nose pads are in a trade-off relationship.

In view of the problems, an object of the present invention is to provide eyeglasses which are stably wearable without nose pads and which have a support structure which is inconspicuous when the eyeglasses are worn.

Solution to Problem

Eyeglasses according to one aspect of the present invention includes: temples which are wide in an upward/downward direction; and temple pads each having a tip and a root, the root being fixed to a prescribed location on an inner side of a corresponding one of the temples, each of the temple pads extending along an extension direction of the corresponding one of the temples to gradually deviates from an inner side surface of the corresponding one of the temples from the prescribed location to the tip, each of the temple pads has a root portions which is narrow and a tip portion formed to have a thick shape that gently protrudes downward, the tip portion being in contact with a wearer's temple when the eyeglasses are worn, the temple pads being entirely or mostly hidden by the temples in a side view.

Each of the temple pads may include a core member made of plastically deformable metal, and a pad body placed over the core member such that one end of the core member is exposed, the pad body including the root portion and the tip portion continuing from the root portion which are formed as an integral member, the pad body being made of a synthetic resin, and the one end exposed from the pad body may be fixed to the prescribed location on the inner side of the corresponding one of the temples, and the core member may extend along the extension direction of the corresponding one of the temples to gradually deviate from the inner side surface of the corresponding one of the temples from the prescribed location to the other end of the core member.

Each of the temples may include a pocket on the inner side surface, the pocket opening in the extension direction of the temple, and the root portion of each of the temple pads may include a tip inserted in the pocket to fix the temple pad to the temple.

The temple, the pocket, and a temple tip may be integrally formed as one member. Moreover, the temple tip may have a tip, and a portion in a vicinity of the tip may protrude inward with a largest thickness of about 7 mm. The root of each of the temple pads may be fixed to a prescribed position at a rearward of the corresponding one of the temples and may extend frontward from the prescribed position. Moreover, the root portion of each of the temple pads may have a side which faces the corresponding one of the temples and on which a projection is provided, the projection protruding to an extent that a gap between each of the temple pads and the corresponding one of the temples at the root portion.

Each of the temple pads may be detachably attached to the corresponding one of the temples.

Advantageous Effects of Invention

According to the present invention, eyeglasses which are stably wearable without nose pads and which have a support structure which is inconspicuous when the eyeglasses are worn.

DESCRIPTION OF EMBODIMENTS

Figure 1:
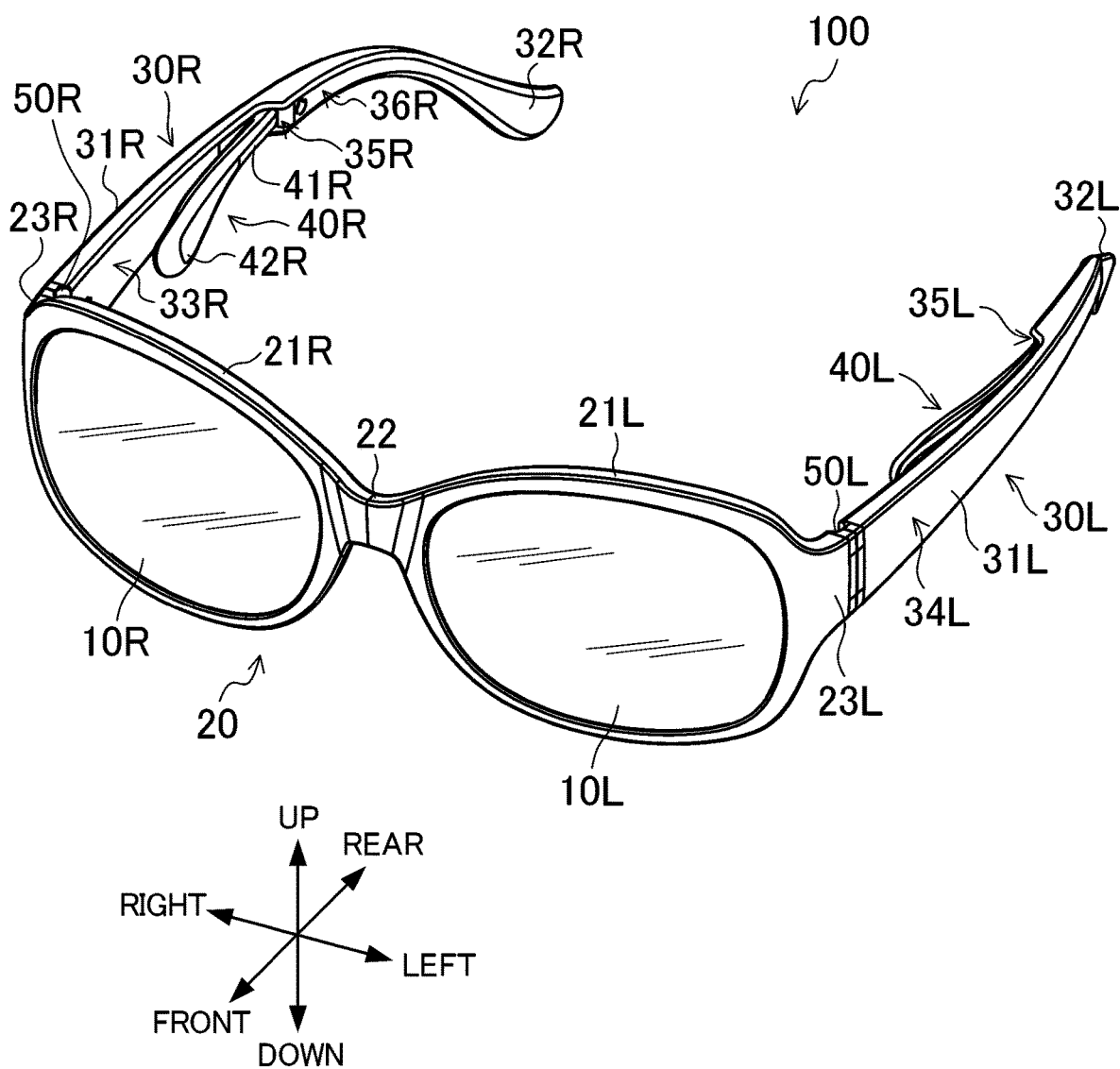
FIG. 1 is a perspective view illustrating eyeglasses according to an embodiment of the present invention.

Embodiments will be described in detail below with reference to the drawings accordingly. Note that unnecessarily detailed description may be omitted. For example, the detailed description of already well-known matters and/or duplicated description of substantially the same components may be omitted. This is to avoid unnecessarily redundant description below and to facilitate the understanding by those skilled in the art.

Note that the inventor provides the drawings and the following description for satisfactory understanding of the present invention by those skilled in the art, and the drawings and the following description do not intend to limit the subject matter of the claims. The dimension, thickness, detailed shape, and the like of each of components shown in the drawings may be different from the actual ones.

Figure 2:
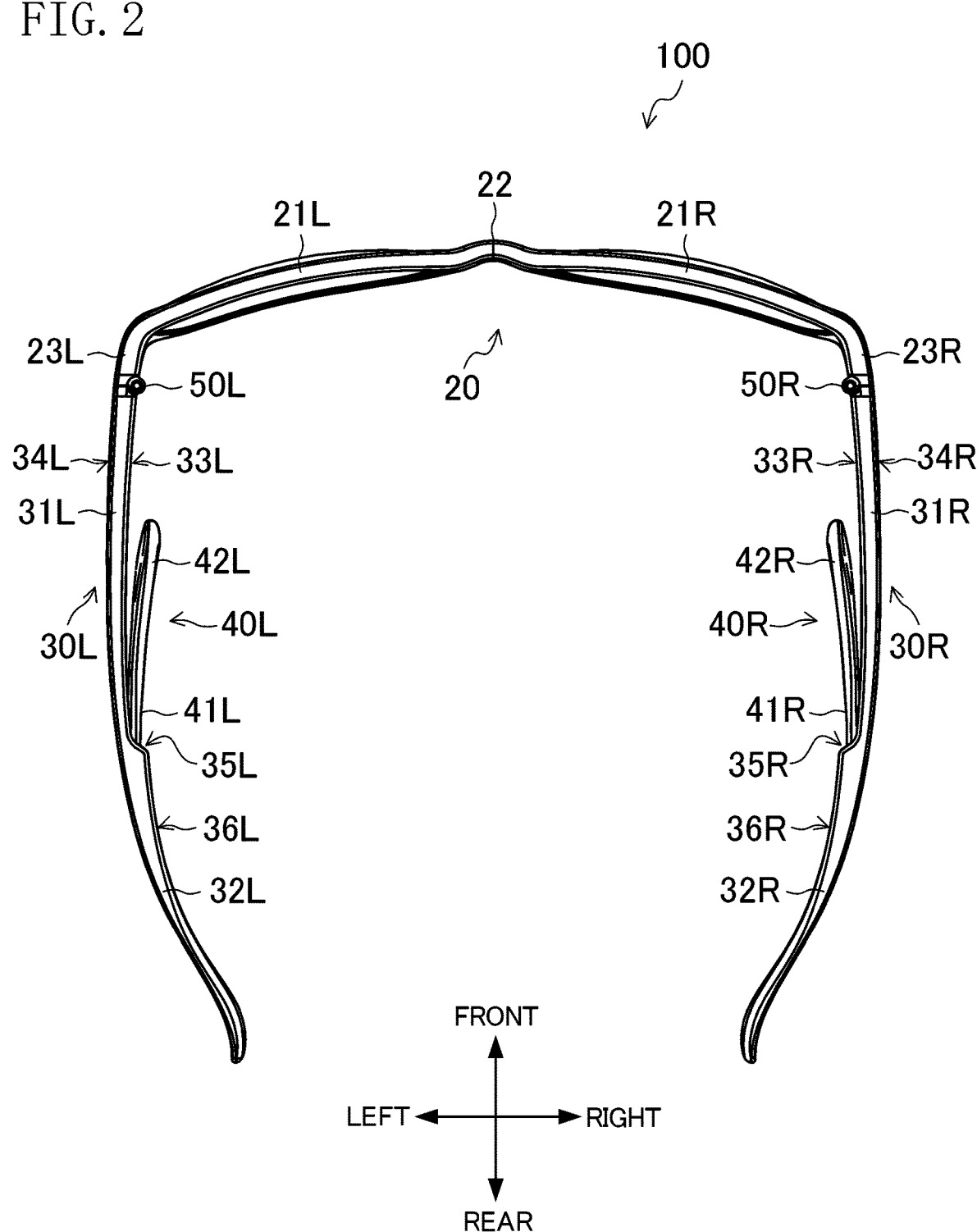
FIG. 2 is a plan view illustrating the eyeglasses according to the embodiment of the present invention.
Figure 3:
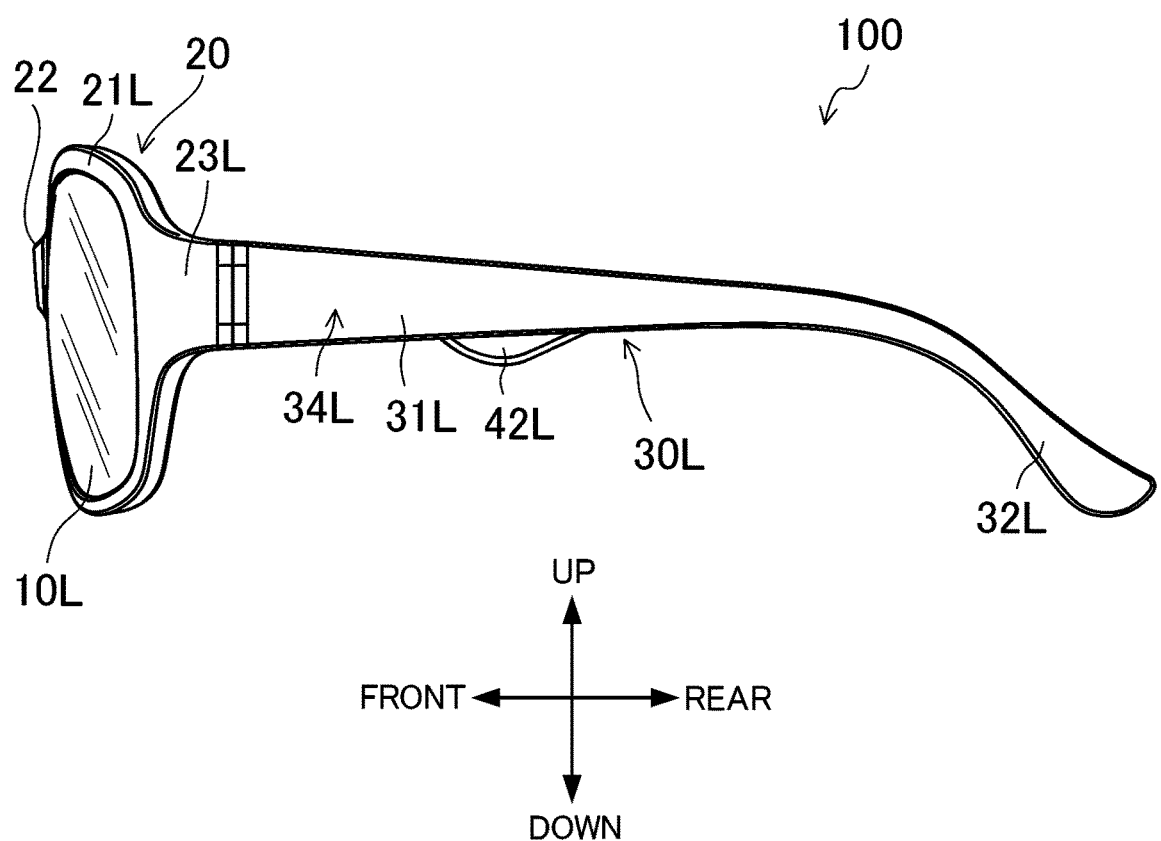
FIG. 3 is a side view illustrating the eyeglasses according to the embodiment of the present invention.

FIG. 1 is a perspective view illustrating eyeglasses according to an embodiment of the present invention. FIG. 2 is a plan view illustrating the eyeglasses according to the embodiment of the present invention. FIG. 3 is a side view illustrating the eyeglasses according to the embodiment of the present invention. Note that in the present specification, the sagittal direction, the horizontal direction, and the vertical direction of the head of a person when the person wears the eyeglasses are respectively referred to as a frontward/rearward direction, a rightward/leftward direction, and an upward/downward direction of the eyeglasses.

Schematic Configuration of Eyeglasses

Eyeglasses 100 according to the present embodiment include a front 20 to which a pair of left and right lenses 10L and 10R is fixed, a pair of left and right temples 30L and 30R, and a pair of left and right temple pads 40L and 40R respectively fixed to prescribed locations on inner sides of the temples 30L and 30R. The temples 30L and 30R are connected to the front 20 respectively via hinges 50L and 50R provided at both left and right ends of the front 20 and are configured to be folded toward the front 20.

Configuration Example of Front

The front 20 is gently curved to slightly protrude frontward and has a curvature which is at least designed in accordance with applications of the eyeglasses 100. For example, the curvature may be increased for fashion eyeglasses, whereas the curvature may be reduced for vision correction eyeglasses. Alternatively, the front 20 may have a straight shape which is not curved.

Specifically, the front 20 includes a pair of left and right rims 21L and 21R to which the lenses 10L and 10R are to be fixed respectively, a bridge 22 connecting the rims 21L and 21R, and a pair of left and right end pieces 23L and 23R respectively provided to a left end of the rim 21L and a right end of the rim 21R. The hinges 50L and 50R are respectively attached to the end pieces 23L and 23R.

The lenses 10L and 10R may be vision correction lenses, light-shielding lenses, or so-called lenses of plain glass. The rims 21L and 21R, the bridge 22, and the end pieces 23L and 23R may be integrally formed as a single member or may be formed as individually separated parts, and the individually separated parts may be connected to each other.

Note that materials for the front 20 may be a synthetic resin or metal.

Configuration Example of Temples

The temples 30L and 30R are formed from, not a narrow bar-like member, but a member having a certain width in the upward/downward direction. Materials for the temples 30L and 30R may be a synthetic resin or metal.

Specifically, the temples 30L and 30R have a shape whose width in the upward/downward direction gradually decreases from their portions connected to the hinges 50L and 50R to their distal portions. The width of the widest portions of the temples 30L and 30R (the portions connected to the hinges 50L and 50R) is about 15 mm, and the width of the narrowest portions (portions bordering temple tips which will be described later) is about 4 mm. Note that these dimensions are mere examples, and the present invention is not limited to this example.

The temples 30L and 30R respectively have substantially linear portions 31L and 31R extending from temples to upper portions of the ears of a person when the eyeglasses 100 are worn by the person. The substantially linear portions 31L and 31R extend in the frontward/rearward direction to form arcs slightly protruding to the outer side. The temples 30L and 30R respectively have temple tips 32L and 32R extending from the upper portions to the back of the ears. The temple tips 32L and 32R extend inward with a decreasing curvature and are curved downward. The substantially linear portions 31L and 31R have substantially rectangular transverse sections and have inner side surfaces 33L and 33R and outer side surfaces 34L and 34R which are substantially flat. Moreover, the temples 30L and 30R have beveled corners. On the other hand, the temple tips 32L and 32R have distal portions which have a thick three-dimensionally curved surface shape gently protruding inward.

The temples 30L and 30R further include pockets 35L and 35R which are respectively on the inner side surfaces 33L and 33R and which are respectively open in an extension direction of the temples 30L and 30R. The temple pads 40L and 40R have root portions whose tips are to be inserted into the pockets 35L and 35R to fix the temple pads 40L and 40R respectively to the temples 30L and 30R.

Figure 4:
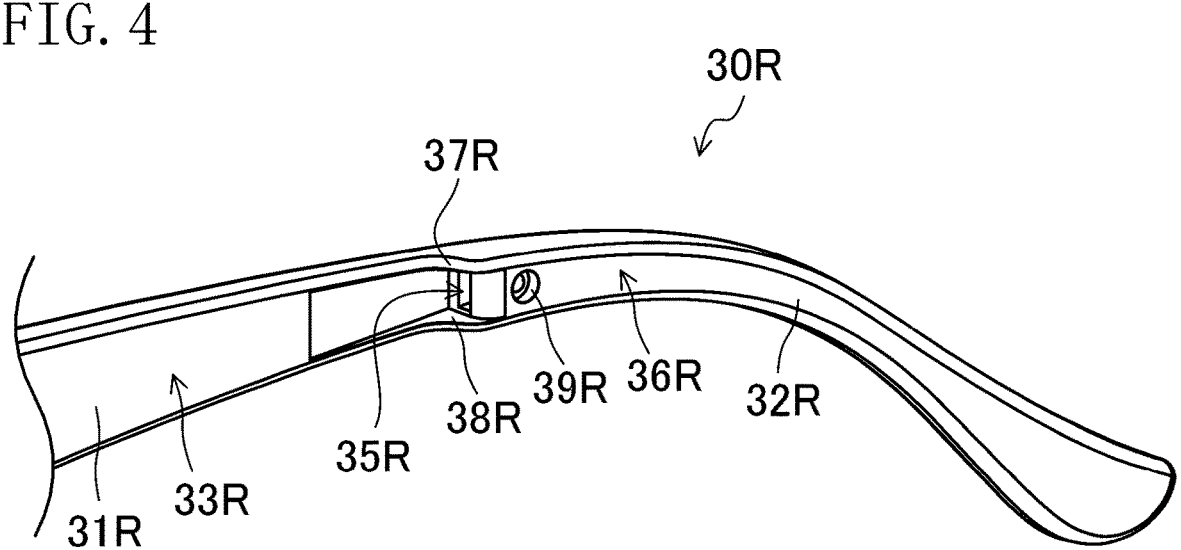
FIG. 4 is an enlarged view illustrating a part in the vicinity of a pocket into which a temple pad is to be inserted.

FIG. 4 is an enlarged view illustrating a part in the vicinity of the pocket 35R into which the temple pad is to be inserted. A part in the vicinity of a rear end of the substantially linear portion 31R of the temple 30R is formed as a thick part protruding inward from the inner side surface 33R of the temples 30R and has the pocket 35R. The thick part protruding inward from the inner side surface 33R smoothly continues to the temple tip 32R, thereby forming an inner side surface 36R of the temple tip 32R.

The pocket 35R has an opening in a front end surface thereof, and the opening has a length of about 3 mm in the upward/downward direction, a length of about 2 mm in the right/left directions, and a depth of about 6 mm in the frontward/rearward direction (the extension direction of the temple 30R). Note that these dimensions are mere examples, and the present invention is not limited to this example.

The pocket 35R has an upper portion at which a rib 37R is formed to smoothly continue from an upper end of the inner side surface 33R of the temple 30R to an upper end of the inner side surface 36R of the temple tip 32R. The pocket 35R has a lower portion at which a rib 38R is formed to smoothly continue from a lower end of the inner side surface 33R of the temple 30R to a lower end of the inner side surface 36R of the temple tip 32R. The pocket 35R is located at the back of a space between these two ribs 37R and 38R. These two ribs 37R and 38R serve as guides when the tip of the root portion of the temple pad 40R is inserted into the pocket 35R.

The inner side surface 36R of the temple tip 32R has a pore 39R formed at a location apart rearward by about 3 mm from the opening of the pocket 35R. The pore 39R is a pore used for screwing the temple pad 40R inserted into the pocket 35R.

Note that the pocket 35L has a shape that is a mirror image of the pocket 35R described above, and the detailed description thereof is thus omitted.

Configuration Example of Temple Pad

Referring back to FIGS. 1 to 3, the temple pads 40L and 40R have respective roots fixed to prescribed locations on the inner sides of the temples 30L and 30R respectively, and the temple pads 40L and 40R extend along the extension direction of the temples 30L and 30R to gradually deviate from the inner side surfaces 33L and 33R of the temples 30L and 30R from the prescribed locations to respective tips thereof. Specifically, the roots of the temple pads 40L and 40R are respectively inserted into and fixed to the pockets 35L and 35R provided in the vicinity of the rear ends of the substantially linear portions 31L and 31R of the temples 30L and 30R, and from there, the temple pads 40L and 40R extend frontward, that is, toward the front 20, along the substantially linear portions 31L and 31R to gradually deviate from the inner side surfaces 33L and 33R of the temples 30L and 30R.

The temple pads 40L and 40R have root portions 41L and 41R which are narrow and tip portions 42L and 42R formed to have a thick shape that gently protrude downward. The tip portions 42L and 42R comes into contact with wearer's temples when the eyeglasses 100 are worn. Moreover, the tip portions 42L and 42R have a thick three-dimensionally curved surface shape gently protruding inward in a similar manner to the distal portions of the temple tips 32L and 32R.

The inner side surfaces 33L and 33R of the temples 30L and 30R are respectively apart from the tips of the temple pads 40L and 40R by about 7 mm. Moreover, in a state where the temples 30L and 30R are open, the temple pads 40L and 40R are apart from each other by about 130 mm between the root portions 41L and 41R and by about 120 mm between the tip portions 42L and 42R. Note that these dimensions are mere examples, and the present invention is not limited to this example.

Figure 5:
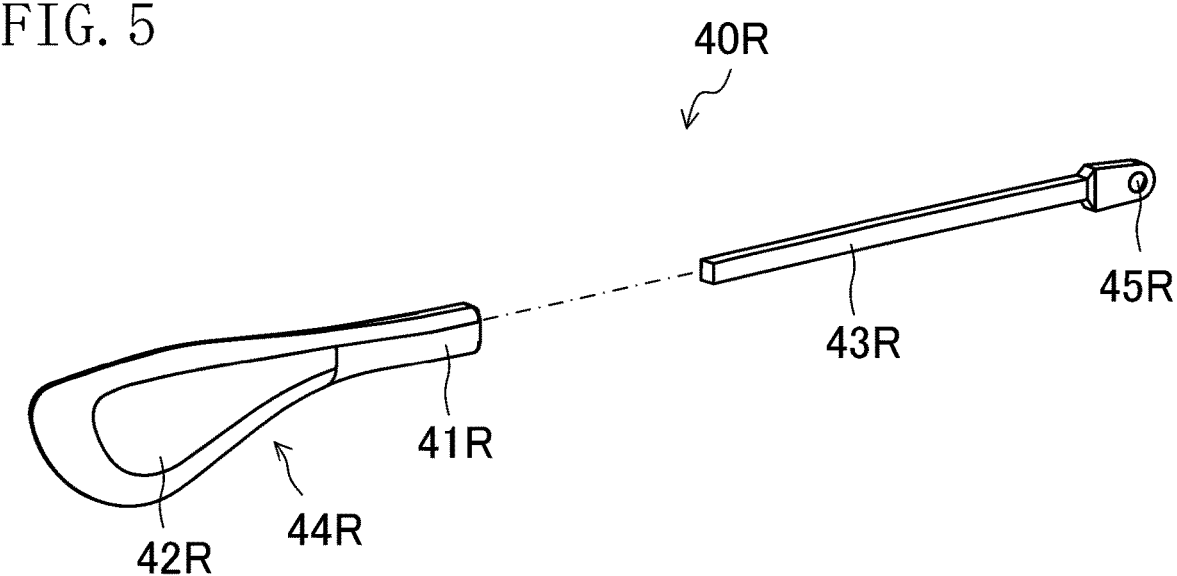
FIG. 5 is an exploded enlarged view illustrating the temple pad.

FIG. 5 is an exploded enlarged view illustrating the temple pad 40R. The temple pad 40R includes a core member 43R made of a plastically deformable metal and a pad body 44R made of a synthetic resin (preferably a slightly soft synthetic resin). The pad body 44R includes the root portion 41R and the tip portion 42R which are formed as an integral member. The tip portion 42R is continuous to the root portion 41R. The core member 43R has one end slightly protruding in the upward/downward direction and has a screw hole 45R. The root portion 41R of the pad body 44R has a side surface having an opening into which the core member 43R is to be inserted. The pad body 44R is configured to, from the opening, be placed over the core member 43R in a direction of the entire length of the pad body 44R. In a state where the pad body 44R is placed over the core member 43R such that the core member 43R reaches a deep part in the pad body 44R, the one end of the core member 43R having the screw hole 45R is exposed.

The dimensions of the core member 43R are about 40 mm in length, about 1 mm in thickness, about 1 mm in width in the upward/downward direction, about 3 mm in width of a portion exposed from the pad body 44R in the upward/downward direction and about 5 mm in length of the portion, and about 1 mm in diameter of the screw hole 45R. The dimensions of the pad body 44R are about 44 mm in entire length, about 3 mm in thickness, about 4 mm in width of the root portion 41R in the upward/downward direction, about 12 mm in maximum width of the tip portion 42R in the upward/downward direction, and about 10 mm in length from a topmost part to a part having the maximum width in the upward/downward direction of the pad body 44R. Note that these dimensions are mere examples, and the present invention is not limited to this example.

Figure 6:
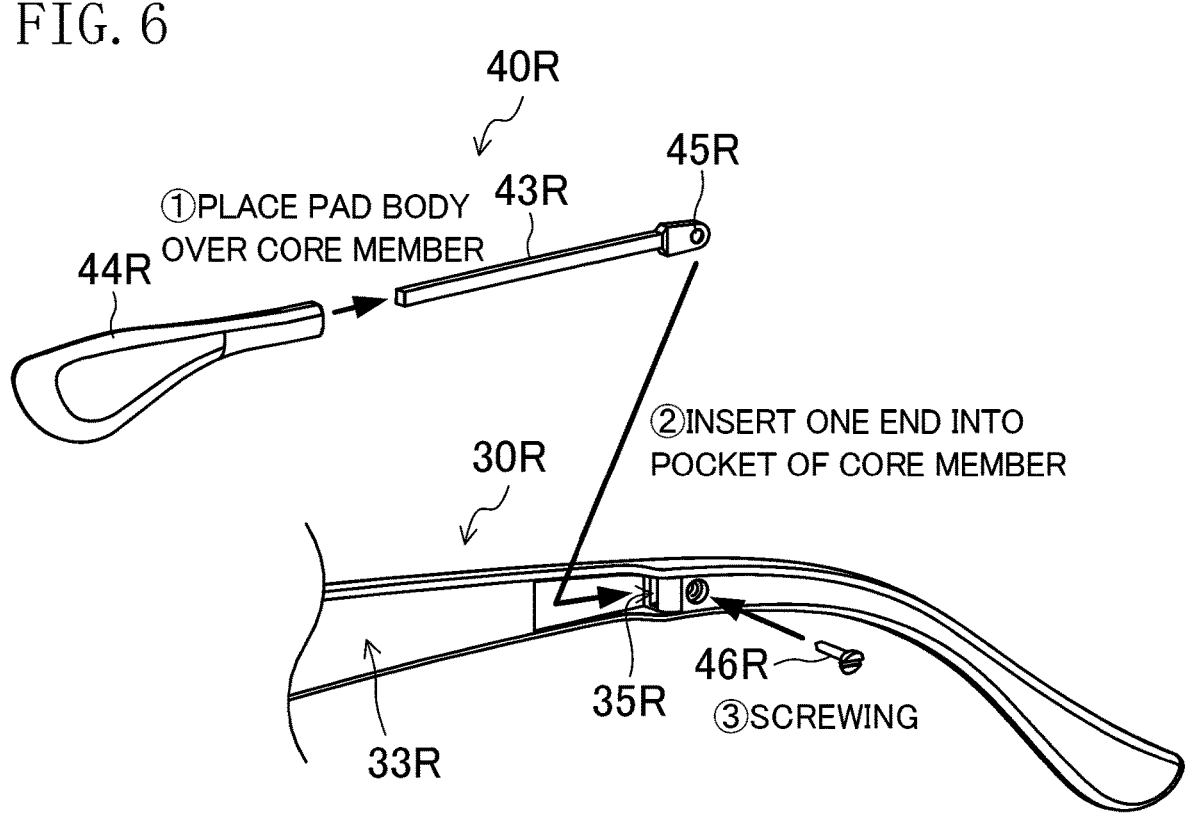
FIG. 6 is a view illustrating how the temple pad is attached.
Figure 6:
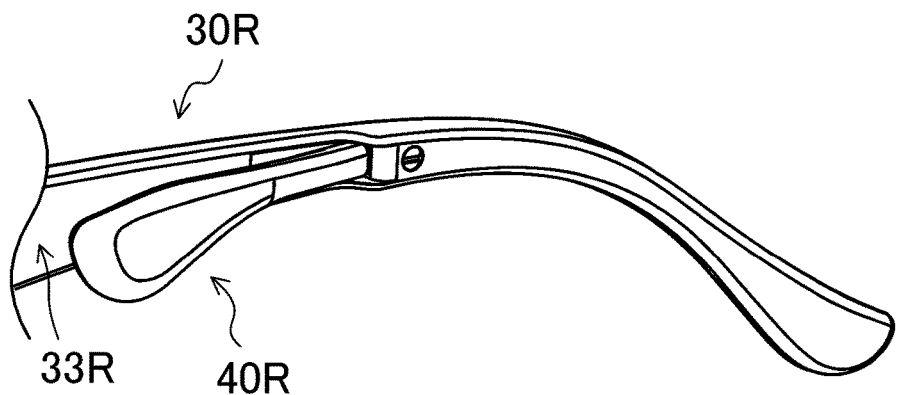

FIG. 6 is a view illustrating how the temple pad 40R is attached. As illustrated in the figure, (1) the pad body 44R is placed over the core member 43R, (2) the one end of the core member 43R having the screw hole 45R is inserted into the pocket 35R, and (3) a screw 46R is inserted into the pore 39R and is screwed, thereby fixing the temple pad 40R to a prescribed fixation location on the inner side of the temples 30R.

The screw 46R has a length of about 3 mm and a diameter of about 1 mm. Note that these dimensions are mere examples, and the present invention is not limited to this example.

When the temple pad 40R is to be replaced, the screw 46R is removed, and the temple pad 40R is pulled out of the pocket 35R and is replaced with a new temple pad 40R. Alternatively, only the pad body 44R may be replaced while the core member 43R remains fixed by the screw to the pocket 35R.

Figure 7:
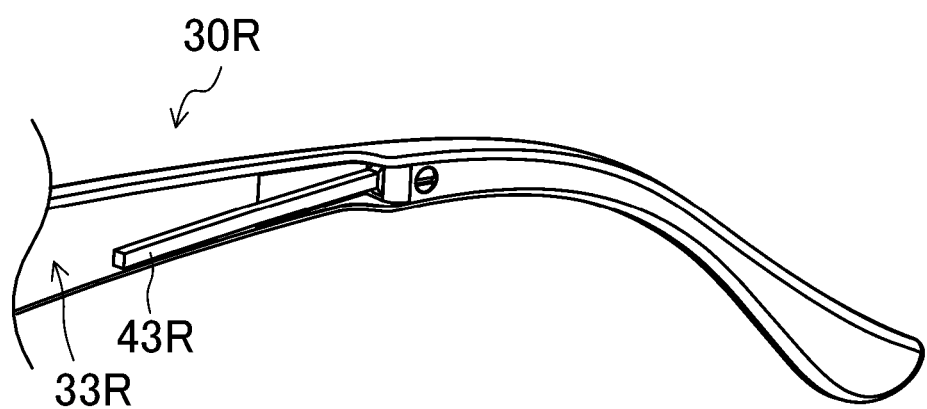
FIG. 7 is a view illustrating a state where a pad body is pulled out of the temple pad.

FIG. 7 is a view illustrating a state where the pad body 44R is pulled out of the temple pad 40R. When the pad body 44R is pulled out of the temple pad 40R, the core member 43R appears. The core member 43R extends along the extension direction of the temple 30R to gradually deviate from the inner side surface 33R of the temples 30R from the one end having the screw hole 45R to the other end of the core member 43R. As illustrated in the figure, the core member 43R is placed over the new pad body 44R with the core member 43R being exposed.

Note that the temple pad 40L has a shape that is a mirror image of the temple pad 40R described above, and the detailed description thereof is thus omitted.

Effects

In the eyeglasses 100 according to the present embodiment, the temple 30L, the temple tip 32L, and the pocket 35L on the left side are integrally formed as a single member, and the temple 30R, the temple tip 32R, and the pocket 35R on the right side are integrally formed as a single member, and in particular, the outer side surfaces 34L and 34R of the temples 30L and 30R are respectively formed to have smooth curved surfaces without steps from portions connected to the hinges 50L and 50R to distal ends of the temple tips 32L and 32R. Moreover, the width and the thickness of the end pieces 23L and 23R in the upward/downward direction are respectively matched to the width and the thickness of the temples 30L and 30R in the upward/downward direction. This achieves a design that provides simple and neat impression with respective portions from the front 20 to the left and right temples 30L and 30R and further to the left and right temple tips 32L and 32R being integrally continuous in a state where the temples 30L and 30R are expanded.

Moreover, when the eyeglasses 100 are worn, the three-dimensionally curved surface shape portions on the inner sides of the distal portions of the temple tips 32L and 32R move from upper portions to the rear portions of the ears while being in contact with temporal regions, and in a state where the eyeglasses 100 are worn, the distal portions of the temple tips 32L and 32R grip the rear portions of the ears from both left and right sides with appropriate force, so that the rear ends of the eyeglasses 100 are firmly held on the head.

Moreover, the roots of the temple pads 40L and 40R are respectively fixed in the vicinity of the rear ends of the substantially linear portions 31L and 31R of the temples 30L and 30R, and the temple pads 40L and 40R are arranged to extend along the substantially linear portions 31L and 31R toward the front 20 to gradually deviate from the inner side surfaces 33L and 33R of the temples 30L and 30R from the rear ends. In this way, when the eyeglasses 100 are worn, the eyeglasses 100 are smoothly worn without the tip portions 42L and 42R of the temple pads 40L and 40R being caught by the temporal regions of the head.

Moreover, since the temple pads 40L and 40R including the core member made of metal have appropriate resiliency, the tip portions 42L and 42R of the temple pads 40L and 40R grip wearer's temples from the left and right sides with appropriate force in a state where the eyeglasses 100 are worn, and thereby, the eyeglasses 100 are securely supported so that the front 20 does not slip off without nose pads.

Moreover, in a state where the eyeglasses 100 are not worn, the tip portions 42L and 42R of the temple pads 40L and 40R may be moved farther inward or farther outward by, for example, applying force to the temple pads 40L and 40R by fingers such that the tip portions 42L and 42R fit to the shape of the head of a person who is to wear the eyeglasses 100.

Moreover, since the pad bodies are detachable with the core members 43L and 43R of the temple pads 40L and 40R being fixed to the temples 30L and 30R, the temple pads 40L and 40R are easily replaceable.

It is further noteworthy that in the eyeglasses 100 according to the present embodiment, the temple pads 40L and 40R are mostly hidden by the temples 30L and 30R in a side view. FIG. 3 is a left side view illustrating the eyeglasses 100, and only a small part of the lower portion of the tip portion 42L of the temple pad 40L appears from the temple 30L.

As described above, the eyeglasses 100 according to the present embodiment adopt the temple pads 40L and 40R having relatively large contact areas to the wearer's temples while the temple pads 40L and 40R are not conspicuous when the eyeglasses 100 are worn. This achieves the object that the eyeglasses are made stably wearable without nose pads and the support structure is made inconspicuous when the eyeglasses are worn.

Variations

The eyeglasses 100 may be accordingly modified as described below. For example, the temple 30L, the temple tip 32L, and the pocket 35L on the left side may be formed as separate parts and may be connected to each other, and the temple 30R, the temple tip 32R, and the pocket 35R on the right side may be formed as separate parts and may be connected to each other.

The temple pads 40L and 40R may be directly fixed to the inner side surfaces 33L and 33R of the temples 30L and 30R without the pockets 35L and 35R.

The frames 21L and 21R may be configured for rimless eyeglass frames or half-rim eyeglass frames.

The hinges 50L and 50R may be omitted.

Slightly increasing the width of the temples 30L and 30R in the upward/downward direction, or slightly reducing the width of the tip portions 42L and 42R of the temple pads 40L and 40R in the upward/downward direction, or both thereof may be performed to hide the entirety of the temple pads 40L and 40R by the temples 30L and 30R in the side view.

Measures Against Pinching of Hair

In the eyeglasses 100 according to the embodiment described above, the temple pads 40L and 40R are arranged to gradually deviate from the inner side surfaces 33L and 33R of the temples 30L and 30R toward the front 20 from the rear ends of the temples 30L and 30R. Therefore, when the eyeglasses 100 are worn, hairs may enter gaps between the temple 30L and the temple pad 40L and between the temple 30R and the temple pad 40R, may be caught by the root portions 41L and 41R of the temple pads 40L and 40R, and may not be able to be pulled out. Thus, the temple pads 40L and 40R may be disposed in an inverted orientation. That is, the roots of the temple pads 40L and 40R may be fixed to the vicinity of the hinges 50L and 50R, and the temple pads 40L and 40R may be attached along the extension direction of the temples 30L and 30R such that the tip portions 42L and 42R gradually deviate from the inner side surfaces 33L and 33R of the temples 30L and 30R rearward from the vicinity of hinges 50L and 50R.

Figure 8:
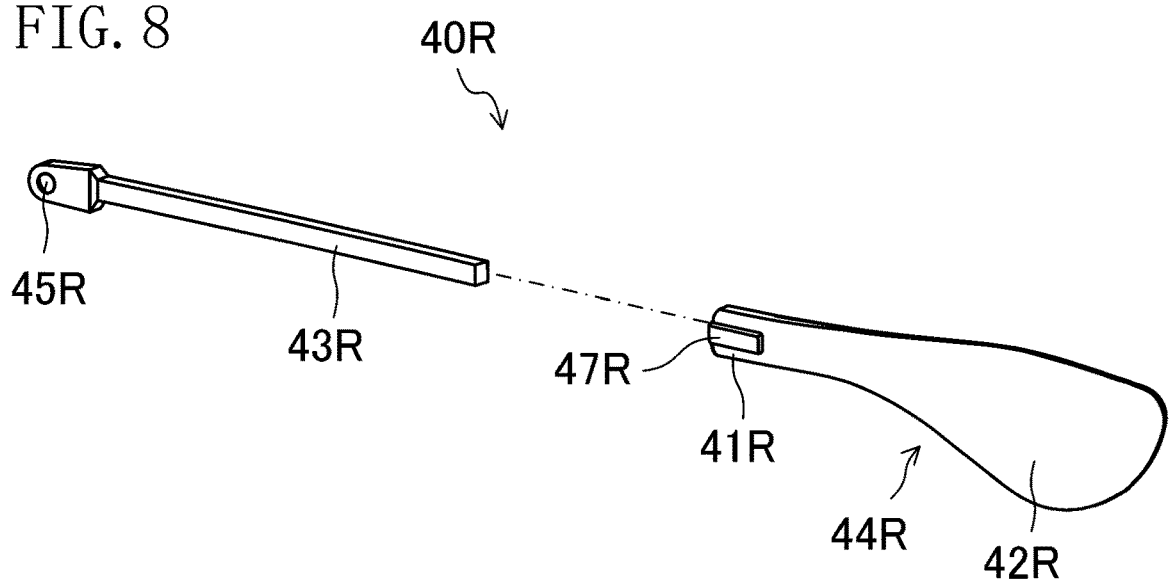
FIG. 8 is a perspective view illustrating a temple pad of a variation.
Figure 9:
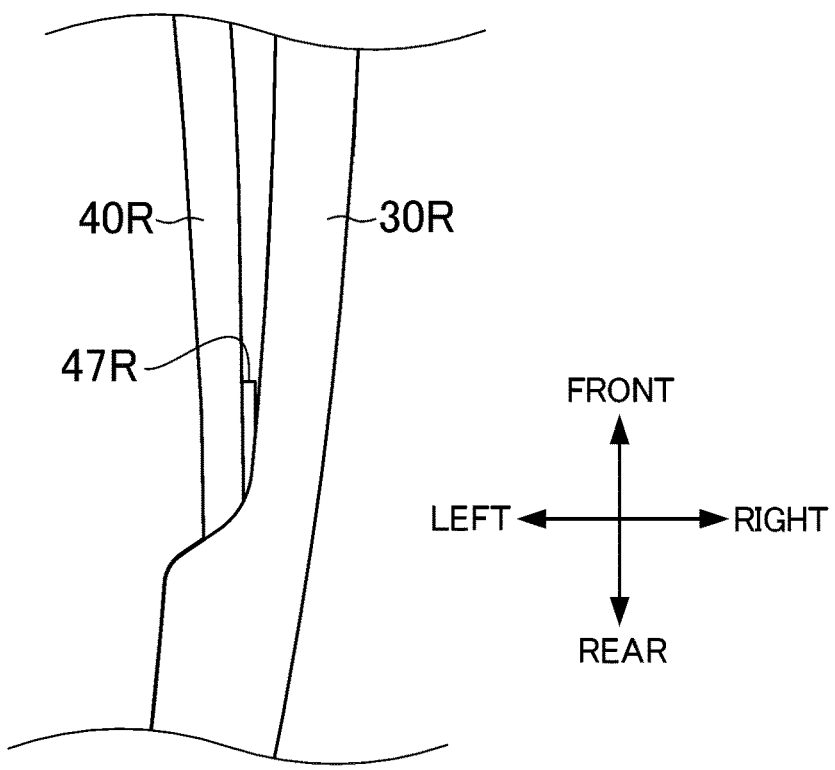
FIG. 9 is an enlarged view illustrating an attachment portion when the temple pad of FIG. 8 is attached to a temple.

Alternatively, the root portion 41R and 41L of the temple pads 40L and 40R may have a projection. FIG. 8 is a perspective view illustrating the temple pad 40R according to the variation and is a view of FIG. 5 viewed from the back. In a temple pad 40R according to the variation, a root portion 41R of a pad body 44R has a side which faces a temple 30R (not shown) and on which a projection 47R is formed. The projection 47R slightly protrudes to such an extent that a gap between the temple pad 40R of the root portion 41R and the temples 30R is filled. For example, the projection 47R protrudes by about 1 mm from a surface of the root portion 41R of the pad body 44R and extends toward the tip portion 42R by about 6 mm with a width of about 2 mm from a side surface (an opening end into which a core member 43R is to be inserted) of the root portion 41R of the pad body 44R. FIG. 9 is an enlarged view illustrating an attachment portion when the temple pad 40R of FIG. 8 is attached to the temple 30R. The gap between the temple pad 40R and the temples 30R at the root portion 41R of the temple pad 40R is filled with the projection 47R. Therefore, even if hairs enter the gap between the temples 30R and the temple pad 40R when the eyeglasses 100 is worn, the hairs are not caught by the root portion 41R of the temple pad 40R but smoothly are pulled out of the gap.

The shape of the projection 47R is not limited to the example shown in FIG. 5 but may be a triangular shape or a hog-backed shape in cross section. Moreover, the projection 47R does not have to extend from the side surface of the root portion 41R of the temple pad 40R but may be disposed to protrude at a location apart by about 6 mm from the side surface of the root portion 41R. Alternatively, a projection may be provided on the inner side surface 33R (see FIG. 7) of the temples 30R without the projection 47R provided to the temple pad 40R. Note that the temple pad 40L has a shape that is a mirror image of the temple pad 40R described above, and the detailed description of the variation thereof is thus omitted.

Measure Against Slipping-Off of Front

Figure 10:
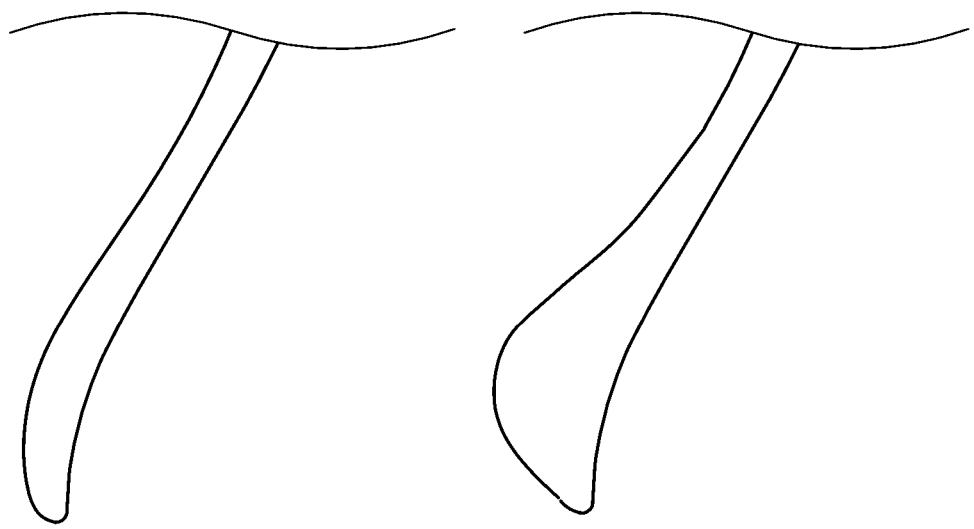
FIG. 10 is a comparative view illustrating a general temple tip and a temple tip of the variation.
Figure 10:
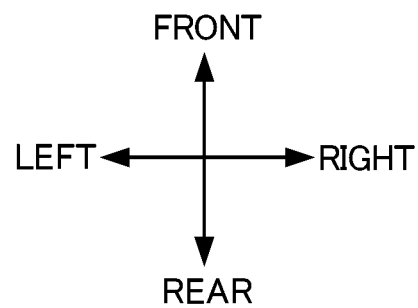

The eyeglasses 100 have no nose pads. Therefore, if the temple tips 32L and 32R do not firmly hold the back of the head (rear portions of the ears) of a wearer, the front 20 may slip off with the tip portions 42L and 42R of the temple pads 40L and 40R serving as supporting points. Therefore, the thickness of the temple tips 32L and 32R may be increased so that the back of the head is more firmly held. FIG. 10 is a comparative view illustrating a general temple tip and a temple tip of the variation. In a similar manner to the general temple tips, the temple tips according to the variation have tips, and a portion in the vicinity of each tip protrudes inward, and the largest thickness of the portion is about 7 mm, which is about three times that of the general temple tip. In this way, increasing the thickness of the portions in the vicinity of the tips of the temple tips enables the temple tips 32L and 32R to firmly hold the back of the head of a wearer, slipping-off of the front 20 to be prevented, and a wearing feeling of the eyeglasses 100 to be improved.

As can be seen in the foregoing, embodiment has been described merely as an example of the technique disclosed in the present invention. For this purpose, the drawings and the detailed description are provided.

Thus, the components illustrated in the drawings and the detailed description may include not only components essential for solving the problems but also components which are mentioned to illustrate the technique but which are not essential for solving the problems. Therefore, these components which are not essential should not be construed as essential only because they are illustrated in the drawings and the description.

Moreover, the embodiment is to illustrate the technique of the present invention, and thus, modification, replacement, addition, omission, and the like may be made in various ways within the scope of the claims or equivalent scopes thereof.

REFERENCE SIGNS LIST

100 . . . EYEGLASSES, 30L, 30R . . . TEMPLE, 32L, 32R . . . TEMPLE TIP, 35L, 35R . . . POCKET, 40L, 40R . . . TEMPLE PAD, 41L, 41R . . . ROOT PORTION, 42L, 42R . . . TIP PORTION, 43R . . . CORE MEMBER, 44R . . . PAD BODY, 47R . . . PROJECTION

The invention claimed is:
1. Eyeglasses, comprising:
temples whose width in an upward/downward direction is wide at a front and gradually narrows at a rear; and
temple pads attached to the temples, wherein
each of the temple pads includes a root and a tip, the root being attached to a prescribed location on an inner side of a corresponding one of the temples, and extends along an extension direction of the corresponding one of the temples to gradually deviate from an inner side surface of the corresponding one of the temples from the prescribed location to the tip,
a root portion of each of the temple pads is narrower than a tip portion thereof, the tip portion being in contact with a wearer's temple when the eyeglasses are worn, and formed to have a thick shape that gently protrudes downward,
each of the temple pads is entirely or mostly hidden by the corresponding one of the temples in a side view,
the root of each of the temple pads is attached to a prescribed position at a rearward of the corresponding one of the temples and extends frontward from the prescribed position, and
a projection is provided, on the root portion of each of the temple pads, on a side which faces the corresponding one of the temples, the projection protruding to such an extent that a gap between each of the temple pads and the corresponding one of the temples at the root portion is filled by the projection thereby preventing hair from being caught by the root portion of the temple pads.
2. The eyeglasses according to claim 1, wherein
each of the temples has a pocket on the inner side surface, the pocket opening in the extension direction of the corresponding one of the temples, and
the root portion of each of the temple pads includes a tip inserted in the pocket to fix each of the temple pads to the corresponding one of the temples.
3. The eyeglasses according to claim 2, wherein
the temple, the pocket, and a temple tip are integrally formed as one member.
4. The eyeglasses according to claim 3, wherein
the temple tip has a tip, and a portion in a vicinity of the tip protrudes inward, and a largest thickness of the portion is 7 mm.
5. The eyeglasses according to claim 2, wherein
a first rib is formed, at an upper portion of the pocket, to smoothly continue from an upper end of the inner side surface of the temple to an upper end of an inner side surface of a temple tip,
a second rib is formed, at a lower portion of the pocket, to smoothly continue from a lower end of the inner side surface of the temple to a lower end of the inner side surface of the temple tip, and
the pocket is located at a back of a space between the first rib and the second rib.
6. The eyeglasses according to claim 2, wherein
the inner side surface of the temple tip has a pore formed at a location apart rearward from the pocket opening, the pore being a pore used for screwing the temple pad inserted into the pocket.
7. The eyeglasses according to claim 1, wherein
each of the temple pads includes
a core member made of plastically deformable metal, and
a pad body placed over the core member such that one end of the core member is exposed, the pad body including the root portion and the tip portion con- tinuing from the root portion which are formed as an integral member, the pad body being made of a synthetic resin, and the one end exposed from the pad body is fixed to the prescribed location on the inner side of the corresponding one of the temples, and the core member extends along the extension direction of the corresponding one of the temples to gradually deviate from the inner side surface of the corresponding one of the temples from the prescribed location to the other end of the core member.

8. The eyeglasses according to claim 1, wherein each of the temple pads is detachably attached to the corresponding one of the temples.

* * * * *